United States Patent [19]

Allison et al.

[11] Patent Number: 5,739,785
[45] Date of Patent: Apr. 14, 1998

[54] LOCATION AND GENERATION OF HIGH ACCURACY SURVEY CONTROL MARKS USING SATELLITES

[75] Inventors: Michael Timo Allison, Santa Clara; Mark Nichols, Sunnyvale; James L. Sorden, Saratoga, all of Calif.

[73] Assignee: Trimble Navigation Limited, Sunnyvale, Calif.

[21] Appl. No.: 587,998

[22] Filed: Jan. 16, 1996

Related U.S. Application Data

[63] Continuation of Ser. No. 26,547, Mar. 4, 1993, abandoned.
[51] Int. Cl.$^6$ ............................... G01S 5/02; G01C 3/04; B43L 5/00
[52] U.S. Cl. ........................... 342/357; 33/490; 33/1 CC
[58] Field of Search ................................ 342/357, 457; 33/421, 484, 485, 490, 1 CC, 1 H

[56] References Cited

U.S. PATENT DOCUMENTS

| | | | |
|---|---|---|---|
| 3,522,992 | 8/1970 | Jaffe | 356/5 |
| 4,225,226 | 9/1980 | Davidson et al. | 356/1 |
| 4,244,123 | 1/1981 | Lazure et al. | 37/193 |
| 4,309,758 | 1/1982 | Halsall et al. | 364/424 |
| 4,398,195 | 8/1983 | Dano | 343/6.5 R |
| 4,463,357 | 7/1984 | MacDoran | 343/460 |
| 4,647,784 | 3/1987 | Stephens | 250/561 |
| 4,677,555 | 6/1987 | Goyet | 364/424 |
| 4,700,301 | 10/1987 | Dyke | 364/424 |
| 4,751,512 | 6/1988 | Longaker | 342/357 |
| 4,796,198 | 1/1989 | Boultinghouse et al. | 364/513 |
| 4,807,131 | 2/1989 | Clegg | 364/424.01 |

(List continued on next page.)

FOREIGN PATENT DOCUMENTS

| | | | |
|---|---|---|---|
| 4175678 | 6/1992 | Japan | 342/357 |

OTHER PUBLICATIONS

"Site Surveyor: Real Time GPS Survey System", Trimble Navigation, Oct. 1992.
Alfred Leick, "GPS Satellite Surveying", 1990, Wiley-Interscience Publication.

(List continued on next page.)

*Primary Examiner*—Gregory C. Issing
*Attorney, Agent, or Firm*—John F. Schipper

[57] ABSTRACT

A method for accurately determining the location of a pre-selected survey or construction mark, or for accurately identifying the survey position for a new mark with pre-selected location coordinates. A Satellite Positioning System (SPS), such as GPS or GLONASS, with at least two SPS stations (antennas and receiver/processors) is used to receive and analyze SPS signals from four or more SPS signal satellites. An SPS signal reference station is placed at a position with known location coordinates, which can be stationary or be known functions of time. An SPS signal roving station receives the location coordinates of the reference station and determines its own location coordinates relative to the reference station, using SPS differential positioning. The roving station is then moved to a pre-selected survey mark or position, either to locate that survey mark or to identify (by marking) a new survey position from pre-selected location coordinates. The reference station analyzes the satellite signals received and transmits this measurement information and the reference station location to the roving station. The roving station independently makes similar measurements using satellites signals it receives. The roving station can contain a data-base of pre-selected positions that are to be located, which may or may not have corresponding physical marks. A handheld survey controller incorporating a visual or audible display is attached to the roving station, which guides the user to one or more of the pre-determined positions. Suitable radio communication apparatus is provided to allow the reference receiver to broadcast information to the roving receiver, even if the roving receiver is not directly visible from the reference receiver.

10 Claims, 2 Drawing Sheets

U.S. PATENT DOCUMENTS

| | | | |
|---|---|---|---|
| 4,812,991 | 3/1989 | Hatch | 364/458 |
| 4,814,711 | 3/1989 | Olsen et al. | 342/357 |
| 4,870,422 | 9/1989 | Counselman | 342/357 |
| 4,873,449 | 10/1989 | Paramythioti et al. | 250/560 |
| 4,924,448 | 5/1990 | Gaer | 367/88 |
| 4,954,833 | 9/1990 | Evans et al. | 342/357 |
| 4,973,970 | 11/1990 | Reeser | 342/357 |
| 5,014,066 | 5/1991 | Counselman | 342/352 |
| 5,030,957 | 7/1991 | Evans | 342/357 |
| 5,077,557 | 12/1991 | Ingesand | 342/357 |
| 5,099,245 | 3/1992 | Sagey | 342/357 |
| 5,100,229 | 3/1992 | Lundberg et al. | 356/1 |
| 5,110,202 | 5/1992 | Dornbusch | 356/1 |
| 5,111,209 | 5/1992 | Toriyama | 342/357 |
| 5,144,317 | 9/1992 | Duddek et al. | 342/357 |
| 5,148,179 | 9/1992 | Allison | 342/357 |
| 5,155,490 | 10/1992 | Spradley et al. | 342/357 |
| 5,233,357 | 8/1993 | Ingesand et al. | 342/352 |

OTHER PUBLICATIONS

Wells et al., "Guide to GPS Positioning", Dec. 1986, Canadian GPS Associates.

GPS Interface Control Document ICD–GPS–200, Rockwell Int'l Corp., Satellite Systems Div., Rev. A, Sep. 26, 1984.

*Guide to GPS Positioning,* David Wells, Canadian GPS Associates, 1986, Chaps. 1, 6, 10.

A Geodetic Survey Receiver w/up to 12 L1 C/A–Code Channels, and 12 L2 Psuedo–P–Code Channels, M.T. Allison, et al, 3rd Int'l Tech. Meeting, Satellite Division of the Institute of Navigation, Colorado Springs, Colorado, Sep. 1990.

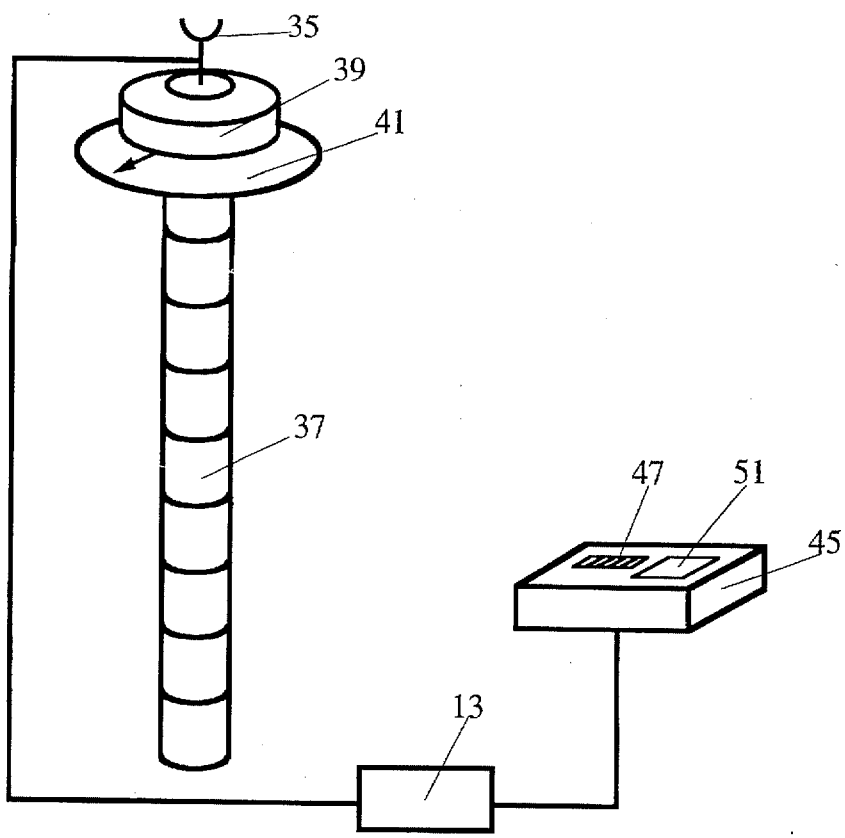
FIG. 2
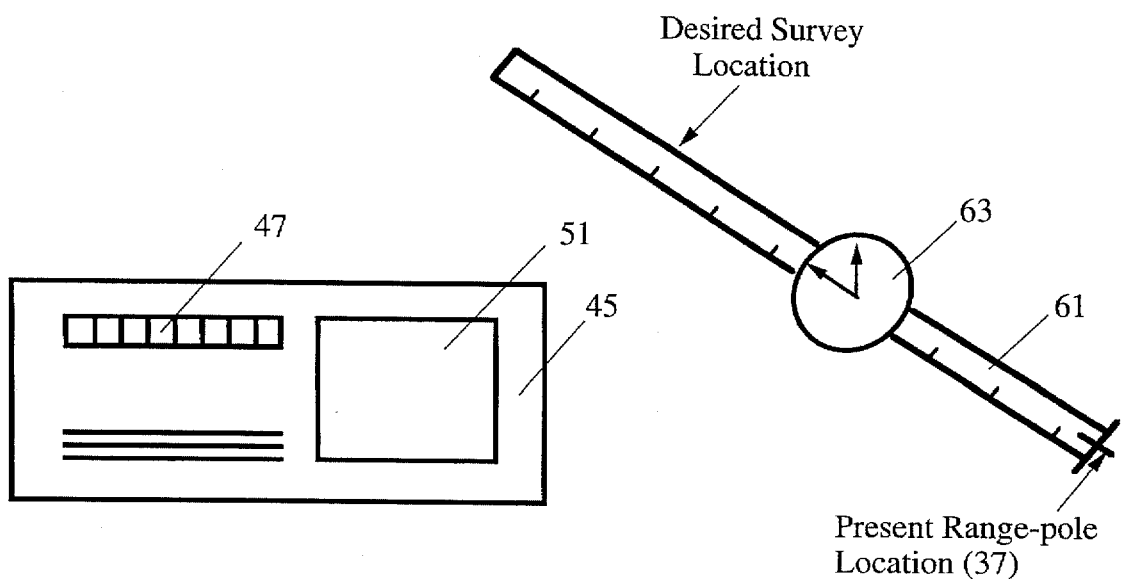
FIG. 3
FIG. 4

LOCATION AND GENERATION OF HIGH ACCURACY SURVEY CONTROL MARKS USING SATELLITES

FIELD OF THE INVENTION

This application is a continuation of a parent application, U.S. Ser. No. 08/026,547, filed on 4 Mar. 1993, now abandoned, and assigned to the assignee of this application. This invention relates to accurate location of existing marked positions, and to generation of new marked positions, on or below the Earth's surface, corresponding to selected positions in a database, and more specifically to use of satellite communications for location and generation of position marks for survey and construction purposes.

BACKGROUND OF THE INVENTION

Survey and construction activities necessarily involve measurement of distances and/or angles, for placement of new marks or for location of marks already set down. One conventional method of performing such measurements is by use of a transit and pole, theodolite, or electronic distance measuring (EDM) equipment. This requires use of cumbersome equipment, usually by at least two persons, for example, one operating the transit and the other holding the pole. If measurements are being made sequentially, an error in one distance or angle measurement will often be incorporated in all later measurements in that sequence. Workers in this field have developed other approaches that do not rely upon use of a transit and pole, theodolite or EDM for survey purposes.

A geodetic survey system using a digital phase meter is disclosed by Jaffe in U.S. Pat. No. 3,522,992. The apparatus measures distances and changes therein between a transmitter and a receiver, by combining, modulating and transmitting two laser beams having different frequencies and measuring their corresponding phase difference at the receiver. The modulated composite light beam is split by a dichroic mirror, and the phase and intensity of each of the two frequency component signals (modulated) is analyzed to determine an initial or reference modulated waveform. The reference waveform is compared with a subsequently received waveform having the same signal frequency to determine any changes in the transmitter-to-receiver optical distance or in the refractive index of the intervening transmission medium. This apparatus requires transmission of two or more light beams along a line of sight, and the apparatus does not appear to be hand-held or transportable by one person.

Davidson et al, in U.S. Pat. No. 4,225,226, disclose use of a rotating laser beam transmitter/receiver to guide an aircraft or similar vehicle that overflies a field or region in a specified pattern for a particular purpose, such as crop spraying. The rotating laser beam transmitter/receiver, which is carried by the aircraft, produces a light beam that is reflected from a sequence of reflectors on the ground that are positioned at known locations relative to each other. The reflected return signals from the ground reflectors allow the aircraft to determine its present location and to fly in the specified pattern relative to these reflectors. It appears that the pattern must be determined and entered before the aircraft begins its work.

A similar approach is disclosed in U.S. Pat. No. 4,398,195, issued to Dano, using radar signals emitted from the aircraft and received and returned by three transponders, positioned at spaced apart locations surrounding the region over which the aircraft pattern is to be flown. The aircraft carries a radar trilateralization receiver that receives and analyzes the return radar signals.

A guidance system for an earth-working vehicle, such as a tractor, is disclosed in U.S. Pat. No. 4,244,123, issued to Lazure et al. A signal transmitter, such as a rotating laser beam source, is positioned in a field to be worked, and two signal receivers are positioned at fixed, spaced apart, longitudinal locations on the vehicle, to distinguish changes by the vehicle in two horizontal directions. The receivers determine and report on the present location and bearing of the vehicle, based on what may be a phase difference of the signals received at the two receivers.

A similar approach is disclosed by Goyet in U.S. Pat. No. 4,677,555, where a rotating laser beam defines a reference plane for the earthworking vehicle. Datum points, defined by several beacons fixed in the ground and indicating the pattern (bearing, elevation) to be followed by the vehicle, are provided. A microcomputer carried on the vehicle monitors the pattern followed by the vehicle.

U.S. Pat. No. 4,309,758, issued to Halsall et al, discloses an unmanned land vehicle guided by three omni-directional light detectors carried on the vehicle. At least two spaced apart light sources must be provided off the vehicle, with each detector receiving light from two of the light sources. The vehicle bearing and location appear to be determined by signal phase differences for light from a common source arriving at the different detectors.

Stephens discloses a guidance and control system for one or more land vehicles in U.S. Pat. No. 4,647,784. Each vehicle generates and transmits a light beam that is reflected from each of two or more reflectors, each reflector having its own optical code (for example, stripes having different light reflectivities) and being oriented to reflect and return the light beam to a light detector carded by the vehicle. The returned light beams from each beam are analyzed to determine the present bearing of the vehicle.

A method of automatically steering a land vehicle, such as a tractor, along a selected course in a field is disclosed in U.S. Pat. No. 4,700,301, issued to Dyke. A rotating laser beam source and directional light detector/processor are mounted on the vehicle, and two or more reflectors are positioned at or near the boundary of the field. The laser beam is reflected from the reflectors, returns toward the vehicle, and is received by the detector/processor, which determines the present location of the vehicle and its present bearing. In another alternative, two rotating laser beam sources are positioned near the edge of the field, the the laser beams emitted by these sources are received by an omni-directional light detector carried on the vehicle.

Use of a rotating laser beam for two-dimensional navigation of a land vehicle in a specified region is also disclosed by Boultinghouse et al in U.S. Pat. No. 4,796,198. Three or more reflectors, one having a distinctive reflectivity, are positioned near the boundary of the region to reflect the laser beam back to the vehicle, where the reflected beams are received by a photoelectric cell and generate signals with associated beam arrival directions that allow determination of the present location of the vehicle. Distinctive reflection from the one mirror provides an indication of the angular position of the laser beam on each rotation.

U.S. Pat. No. 4,807,131, issued to Clegg, discloses an automated land grading system in which the position of a cutting blade is controlled automatically to provide controlled shaping of a land region being graded. A laser beam is projected in a predetermined pattern across the land region, and a laser detector carded on the grading machine receives the beam and approximately determines the location of the cutting blade and the blade angle and depth appropriate for grading that location in the land region. Information on the desired blade angle and depth is stored by a microprocessor carried on the grading machine and is compared with the actual blade angle and depth to correct the blade orientation and elevation.

Olsen et al disclose survey apparatus for collection and processing of geophysical signals, using a Global Positioning System, a GPS base station and one or more data acquisition vehicles, in U.S. Pat. No. 4,814,711. Each vehicle carries geophysical measuring instruments, a GPS signal receiver and processor to determine present location, a visual display of present location, and radio communication equipment to transmit location information to the base station. The base station periodically polls and determines the present location of each vehicle, with reference to a selected survey course that a vehicle is to follow. The base station transmits commands to each vehicle to keep that vehicle on the selected course. Each vehicle also transmits results of the geophysical data it has measured to the base station for correlation and possible display at the base station. This apparatus requires continual tracking, control and correction of the course of each vehicle relative to the desired course and requires use of non-portable apparatus (a vehicle and its equipment) to provide the desired location and data measurements. All such measurements are transmitted to, and analyzed by the stationary base station, and the measurements probably are accurate only to within a few meters.

U.S. Pat. Nos. 4,870,422 and 5,014,066, issued to Counselman, disclose method and apparatus for measuring the length of a baseline vector between two survey marks on the Earth's surface, using a GPS signal antenna, receiver and processor located at each mark to determine the location of at mark (accurate to within a few meters). The location data are determined using GPS carder phase measurements at each survey mark and are transmitted to a base station for analysis to determine the baseline vector length between the two marks. This approach requires use of two survey spaced apart survey marks and a base station. Use of GPS signals from five or more GPS satellites and use of a surveying time interval of length $\Delta t \geq 5000$ seconds are required in order to reduce the mark location inaccuracies to a less than a centimeter.

Paramythioti et al, in U.S. Pat. No. 4,873,449, disclose method and apparatus for three-dimensional surveying, using triangulation and a laser beam that propagates along the perimeter of a triangle. A rotatable mirror, a component of the scene to be surveyed and a light-sensing camera are located at the three vertices of the triangle, and knowledge of the angles of orientation of the rotatable mirror and the camera allow determination of the location of the component of the scene presently being surveyed. Three spaced apart stations, including one station at the scene to be surveyed, and line-of-sight light beam receipt are required here.

Survey apparatus and method for mapping a portion of an ocean bottom are disclosed by Gaer in U.S. Pat. No. 4,924,448. Two ships, each equipped with identical GPS signal antennas, receivers and processors, move along two parallel routes a fixed distance apart on the surface of an ocean. Each ship takes radio soundings of a small region of the ocean bottom directly beneath itself and receives a reflected radio sound from that same region that is originally transmitted by the other ship. The depths of the region directly beneath each ship, as determined by each of the two radio sound waveforms and by the GPS-determined locations of the two ships, are determined and compared for purposes of calibration.

In U.S. Pat. No. 4,954,833, issued to Evans et al, a method for determining the location of a selected and fixed target or site, using a combination of GPS signals and the local direction of gravitational force. Geodetic azimuth is determined using GPS signals, and the local gravitational force vector is used to relate this location to an astronomical azimuth, using a fixed coordinate system that is independent of the local coordinate system. The target and a reference site are each provided with a GPS signal antenna, receiver and processor to determine the local geodetic azimuth.

A method for waste site characterization using GPS is disclosed by Reeser in U.S. Pat. No. 4,973,970. A GPS base station is established on the site, and a plurality of GPS roving receivers, each combined with a contamination level monitor, is used to determine locations of sites for core sampling. Experimental cores are formed in, and pulled from, the waste and examined for contamination level. The GPS-determined location of the core site is transmitted to the base station for archiving and any further hazardous material analysis.

Evans, in U.S. Pat. No. 5,030,957, discloses a method for simultaneously measuring orthometric and geometric heights of a site on the Earth's surface. Two or more leveling rods are held at fixed, spaced apart locations, with a known baseline vector between the rods. Each rod holds a GPS signal antenna, receiver and processor that determines a GPS location for each rod. The geometric height of the GPS antenna (or of the intersection of the rod with the Earth's surface) is determined for each rod, and the geometric height difference is determined, using standard GPS measurements (accurate to within a few meters). The orthometric height difference for each GPS antenna is determined using the measured GPS location of each rod and an ellipsoid or geoid that approximates the local shape of the Earth's surface.

A surveying instrument that uses GPS measurements for determining location of a terrestrial site that is not necessarily within a line-of-sight of the satellites is disclosed in U.S. Pat. No. 5,077,557 issued to Ingensand. The instrument uses a GPS signal antenna, receiver and processor ,combined with a conventional electro-optical or ultrasonic range finder and a local magnetic field vector sensor, at the surveyor's location. The range finder is used to determine the distance to a selected mark that is provided with a signal reflector to return a signal issued by the range finder to the range finder. The magnetic field vector sensor is apparently used to help determine the surveyor's location and to determine the angle of inclination from the surveyor's location to the selected mark.

U.S. Pat. No. 5,099,245, issued to Sagey, discloses a satellite-based location system for airborne vehicles, using a Geostar satellite system. Three or more ground base stations with known locations each receive a transmitted timing signal from a satellite. The base stations retransmit this signal with an identifying tag, after a pre-selected time delay, to the airborne vehicle. The times of retransmitted signal arrival are noted by the vehicle and are used to determine the vehicle's present location by triangulation.

A spatial position determining system using three or more (preferably four) fixed reference stations and a portable signal sensor is disclosed by Lundberg in U.S. Pat. No. 5,100,229. Each reference station is provided with a rotating laser beam source and a radiowave or light wave strobe transmitter that is triggered each time the corresponding rotating laser beam passes a specified angular position in its sweep. The portable signal sensor is positioned at an arbitrary location spaced apart from each of the strobe transmitters. When the sensor receives either the laser beam or the strobe pulse from each reference station, the time of receipt is entered in a computer connected to the sensor, and the sensor location is determined by the computer by triangulation.

Dornbusch et al, in U.S. Pat. No. 5,110,202, discloses use of a three-dimensional positioning and measurement system that uses three or more fixed base stations, each having a rotating laser beam, and one or more portable and movable stations, each having a laser beam detector, a computer and a visual display. As each laser beam rotates one revolution about an approximately vertical axis, this produces an electrical pulse at the detector, which pulse is time stamped by the computer. Knowledge of the time associated with appearance of the laser-generated pulse for contemporaneous revolutions for the base station lasers allows determination of the position of the portable station. An alternative approach uses two counter-rotating laser beams at each of two fixed base stations.

A satellite-based ground location determination system using two geostationary satellites and a fixed ground base station is disclosed by Toriyama in U.S. Pat. No. 5,111,209. A mobile vehicle whose location is to be determined transmits an initial signal through one of the two satellites to the base station, and the base station transmits a return signal through each of the two satellites to the mobile vehicle. The vehicle location is then determined by some form of triangulation. It is unclear how ambiguities in location can be removed using only two satellites.

U.S. Pat. No. 5,144,317, issued to Duddek et al, discloses use of a fixed GPS base station and four or more GPS satellites to monitor progress in an open pit mine, including determination of the location and spatial orientation of selected mining equipment, such as a bucket wheel of a travelling excavator. A second GPS receiver is positioned on the equipment item to help determine orientation and movement of the equipment.

A geodetic surveying system using three or more non-collinear GPS base stations and a roving land vehicle carrying a fourth GPS receiver is disclosed by Spradley et al in U.S. Pat. No. 5,155,490. The location of each GPS base station must be initially determined over a long period of time (10–12 hours). The land vehicle also carries a GPS receiver and receives GPS signals from four or more GPS satellites and from each base station. Vehicle location data determined from these signals appear to be post-processed to determine the vehicle's location at some time in the past.

These approaches rely upon measurements made using one or more laser beam or similar means, use cumbersome equipment, rely upon line-of-sight measurements, employ two or more persons for operation, and/or do not provide the accuracy required for many survey and construction activities. What is needed is an approach that (1) allows use of handheld devices for mark location, (2) allows location in real time of a new mark that is initially identified only in a database, (3) does not require two or more persons to implement the approach, (4) does not require line-of-sight measurements between two survey equipment items, (5) provides distance measurements and angle measurements, for mark location and generation purposes, accurate to within a few centimeters and to within a fraction of a degree, respectively, and (6) allows use of a single base station as a reference for measurements.

SUMMARY OF THE INVENTION

The invention is a method that satisfies these requirements with a minimum of hardware (signal reception and processing circuitry), using two or more signal receivers in a Satellite Positioning System (SPS), such as the Global Positioning System (GPS) or the Global Orbiting Navigational System (GLONASS). An SPS position determination method known as differential positioning, one version of which is discussed by Allison in U.S. Pat. No. 5,148,179, incorporated by reference herein, is used to measure relevant distances to, and thus locate, a plurality of survey or construction marks on or near the Earth's surface for which such measurements are required.

The method begins by positioning an SPS signal reference antenna and receiver (referred to simply as a "receiver" for convenience here) and radio transmitter at a location whose coordinates are known with sufficient accuracy. The reference receiver may be stationary or may be moving, with location coordinates that are known functions of time t. An SPS signal roving receiver is then moved to one or more pre-selected positions that are spaced apart from the reference receiver, using SPS differential positioning relative to the reference receiver location in real time to guide the roving receiver to the pre-selected position. The pre-selected location may exist in a database contained in the roving receiver, which in turn may be a subset of some larger database maintained by a computer located elsewhere. For each pre-selected location entered in the database, a corresponding physical position may exist on or near the Earth's surface. In this case, the invention allows accurate determination of the location of these physical marks, even if a mark has become obscured or buried. Maintenance of a line of sight from the reference receiver to the roving receiver is not required. Alternatively, the mark locations may be defined by the database, without corresponding physical marks, for example by the construction plans of a new road or building. In this situation, the invention allows location of positions with the specified location coordinates on or near the Earth's surface, such that new physical position marks can be generated. These physical position marks may comprise wooden stakes or pegs or chalk marks of a temporary nature, or more permanent marks such as brass monuments set in concrete.

A Satellite Positioning System (SPS) is a system of satellite signal transmitters, with receivers located on the Earth's surface or adjacent to the Earth's surface, that transmits information from which an observer's present location and/or the time of observation can be determined. Two operational systems, each of which qualifies as an SPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium and rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1500 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips and thus repeats every millisecond. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 Sep. 1984, which is incorporated by reference herein.

The GPS satellite bit stream includes navigational information on the ephemeris of the transmitting GPS satellite and an almanac for all GPS satellites, with additional parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *Guide To GPS Positioning*, edited by David Wells, Canadian GPS Associates, 1986.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . , 23) is the channel or satellite number. These frequencies lie in two bands at 1.597–1.617 GHz (L1) and 1.240–1.260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SPS. A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SPS that compromise the accuracy of absolute position determination are similar in magnitude for stations that are physically close. The effect of these errors on the accuracy of differential position determination is therefore substantially reduced by a process of partial error cancellation.

Numerous survey applications require the determination of the relative position between stations. Geodetic survey applications can be subdivided into (1) applications in which all of the stations receiving the satellite signals are stationary, referred to as static surveying, and (2) applications in which one or more of the stations is moving relative to other stations, referred to as kinematic surveying. The latter class of applications is increasingly popular, because many more relative station positions can be determined in a fixed time of observation of the satellites.

One or more stations is designated as a reference station, and is preferably fixed at a known position (or, less likely, is moving with coordinates that are known functions of time). The locations of one or more other stations, known as the roving receiver stations, which also may be stationary or moving, are calculated relative to the present location of the reference station. The approximate absolute position of the reference station is required. This position, if not previously determined, can be computed using established absolute position determination methods that utilize measurement of PRN code phases.

In these applications, it is usual to record satellite measurements within the stations, and then post-process the data at a later time, having first combined the data from both stations. In this approach, the position of the roving receiver cannot be determined in real time as the receiver user moves around. Because of this limitation, systems that post-process the data cannot be used to accurately locate, in real time, an existing physical survey mark of known position on or just below the Earth's surface. In addition, for systems that post-process the data, it is not possible to specify an arbitrary pre-selected location by its coordinates contained in a mapping database and to then generate a new physical mark at the corresponding location on the Earth's surface. Applications using a conventional approach rely on data post-processing and are concerned with the determination of the locations of existing physical marks. In such approaches, a physical mark is first generated and the position of this mark is then accurately determined. It is not possible to first establish an arbitrary mark in a mapping database (without a pre-existing physical mark), and then accurately generate the corresponding physical mark at a later time. The present invention does not suffer from these limitations and allows identification, in real time, of the physical location of a mark, beginning with location coordinates of the mark contained in a database.

A number of specific survey applications covered by the present invention require the ability to accurately locate existing physical position marks and generate new physical position marks from pre-selected locations contained in a database. These include the marking of positions used in construction and building sites, referred to as stake-out. The pre-selected positions would typically exist on the construction plans. The accuracy of the generated position marks must typically be to within 1–3 centimeters.

Traditional techniques for generating physical position marks from a mapping database rely on optical instruments such as theodolites and EDM (electronic distance measurement) devices. A more recent survey device is the Total Station that combines a theodolite and an EDM device. A disadvantage of such systems is the necessity for clear visibility between a reference mark, and the new position mark. Without such visibility, multiple measurements may be necessary, which may result in the accumulation of errors.

For the presently disclosed invention, very high accuracy in differential positioning, and thus in location of a mark, is obtained by measurement and utilization of the received carrier phase of the L1 and/or L2 signals at precisely known times, derived from clocks within the SPS receivers. Some techniques for processing SPS data for surveying applications use only these carrier phase measurements in the calculation of differential positions, with measurement of PRN code phases only used to calculate accurate time-marks for the carrier phase measurements. Yet other methods also use PRN code phase measurements together with carrier phase measurements in the calculation of differential positions. One such method has been described by Allison, in U.S. Pat. No. 5,148,179. Another such method is described by Hatch in U.S. Pat. No. 4,812,991, incorporated by reference herein. All these methods are applicable to the present invention.

A difficulty occurs if only the carrier phase measurements are utilized in the calculation of differential positions. These measurements are ambiguous. The measurement from each satellite includes the measurement of a fractional phase $\phi(0° \leq \phi < 360°)$ plus an additional integer number N of whole cycles of phase. This integer number or integer ambiguity cannot be directly measured by an SPS receiver.

A process known as phase integer initialization is used to establish the initially unknown phase integer ambiguities. One approach is to set the receivers at marks whose relative positions are already known with sufficient accuracy. These relative positions are also known as baselines, and are defined by (x,y,z) vector components. Another approach is to allow the receivers to remain static at arbitrary marks for a period of time, to allow static surveying techniques to be used to resolve the phase integers. Another approach is to exchange the antennas between receivers set at arbitrary marks which are close together without disturbing the signal reception during the exchange of the antennas. Another approach, disclosed in a recent patent application by Allison et al, U.S. Ser. No. 07/999,099, rotates the roving receiver antenna 180° about a fixed reference receiver antenna. Another approach, disclosed in the same patent application, uses an azimuth measuring device incorporated into a fixture together with the reference and roving receiver antennas.

The methods so far mentioned rely principally on carrier phase measurements to resolve the phase integers. Other methods use a combination of carrier phase measurements and PRN code phase measurements to resolve the integers. Such a method has been described by Allison, in U.S. Pat. No. 5,148,179. These methods do not require the roving and reference receiver to remain relatively static during the initialization procedure, which can be a significant advantage. All of the above-described initialization methods are applicable to the present invention.

Once the phase integer ambiguities are resolved, differential positioning is possible with the full accuracy obtained by the carrier phase measurements. However, if signal lock cannot be maintained on four satellites, the initialization procedure may need to repeated.

The present invention provides a method that extends kinematic surveying (which is used to determine the relative positions of established physical marks on the Earth's surface and, therefore, has limited application), and allows a roving receiver to be moved to a pre-selected position relative to a reference receiver. The position may only exist in the database of the roving receiver, or may already have a corresponding physical mark on the Earth's surface. If a physical mark does not yet exist, it can be easily generated once the roving receiver has been moved to the pre-selected location, and thus has been used to locate the position of the required new physical mark. The method allows the processing of satellite carrier phase data collected at both the reference and roving receivers in real-time, such that the roving receiver can compute its position in real-time with an inaccuracy of no more than a few centimeters, and use this information to accurately guide the user to the pre-selected location. The roving receiver incorporates electronic displays to facilitate guidance of the user to the pre-selected location.

An existing physical position mark may become obscured or buried, sometimes temporarily, by prevailing weather conditions, such as snow or sandstorm, or by unintentional coverage of the mark by soil, rock or other objects. Thus, even if the generation of new marks is not required, the location of existing marks may require centimeter-level accuracy. A further object of the present invention is to provide such accuracy by processing carrier phase measurements. Systems which only use pseudorange measurements, such as those using the RTCM 104 differential standard for SPS pseudorange corrections (defined by the RTCM Special Committee 104 of the Radio technical Commission for the Maritime Services), do not provide sufficient accuracy, because the pseudorange measurements have a noise level much greater than the carrier phase measurements and have limited application for survey and construction activities.

The present invention provides a method that allows measurement of distances and angles and identification of a location with pre-selected coordinates without requiring clear visibility or line of sight between the reference receiver and roving receiver. This allows the method to be used in situations in which traditional optical surveying instruments cannot be used. The method includes a suitable communication system between the reference and roving receivers that operates without requiring direct radio communication between the two receivers. The apparatus used is sufficiently lightweight and portable to allow a single operator to easily locate pre-selected positions and/or perform distance and angle measurements on the Earth's surface in real time.

The invention allows the pre-selected location(s) to be defined in any coordinate reference system, including but not limited to the reference system used by the satellites. An example of a satellite coordinate system is the WGS84 geodetic system. Other coordinate systems include state plane coordinates, and geodetic systems with specific datums. To accommodate these various systems, the roving receiver is capable of performing three or seven parameter datum transformations in real-time.

BRIEF DESCRIPTION OF THE DRAWINGS

FIG. 2 illustrates use of a range-pole for the antenna of the roving receiver, according to an embodiment of the invention.

FIG. 3 illustrates a graphic user interface or visual display that is optionally provided on the SPS roving receiver according to the invention.

FIG. 4 illustrates use of a range-pole and a graduated stick or rod having length markings thereon, to facilitate identification of a pre-selected location using the invention.

DESCRIPTION OF BEST MODE OF THE INVENTION

Figure 1:
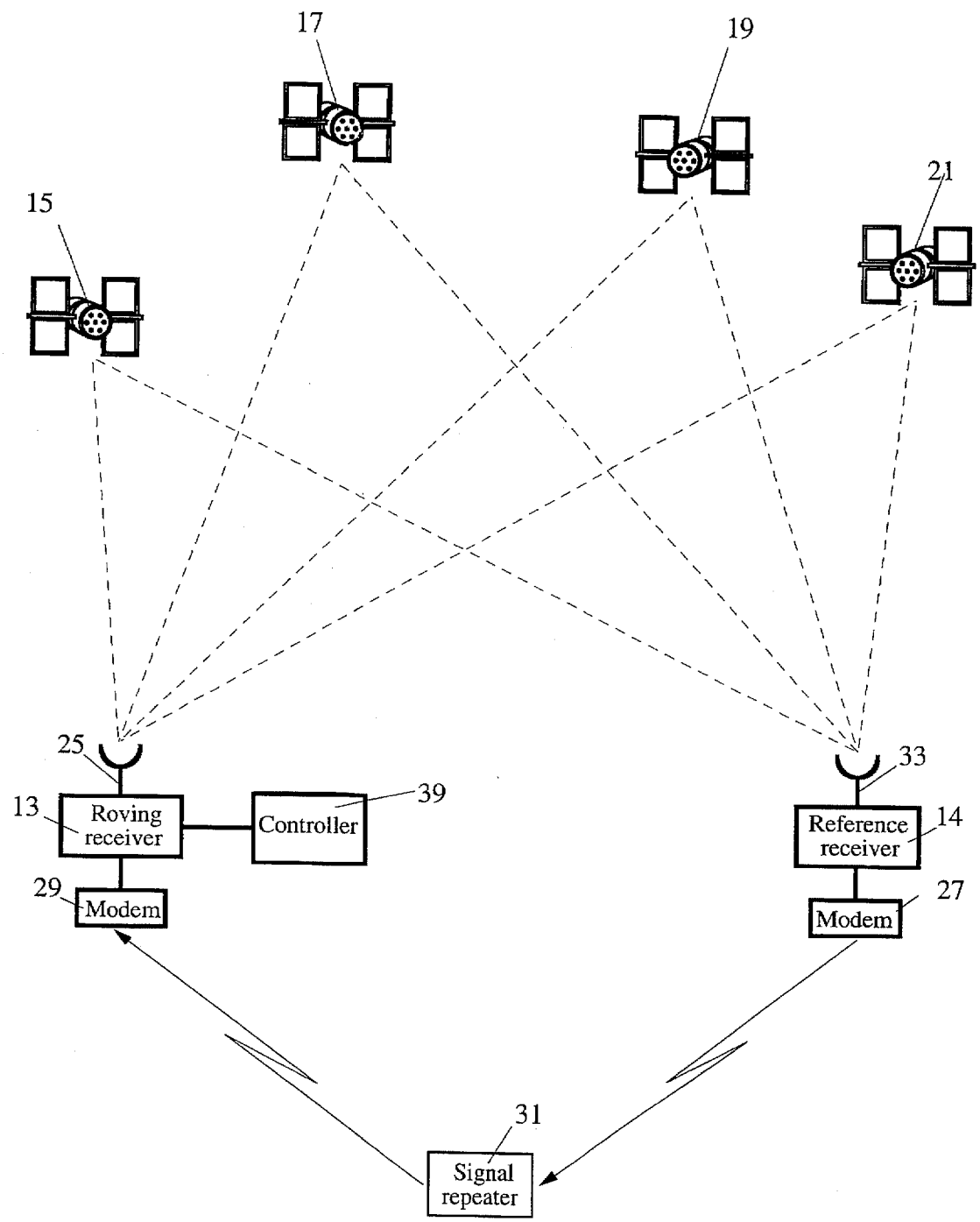
FIG. 1 schematically illustrates operation of apparatus used in the invention, utilizing SPS signal receivers and satellites.

FIG. 1 illustrates the preferred embodiment of the apparatus, which allows accurate determination of the location of one or more roving receivers (also known as stations) relative to a reference receiver in real-time, using radio-signals received from a plurality of Earth-orbiting satellites, and using radio modems for inter-station communication, and which subsequently allows the roving receivers to be accurately moved to pre-selected locations on the Earth's surface. The positions exist in a database at the roving receiver before the survey begins, or may be transmitted to the roving receiver from the reference receiver at a later time. Corresponding physical position marks may already exist on or just below the Earth's surface, in which case these marks can be located using the invention. Alternatively, the physical marks may not yet exist, in which case the required location of the marks can be determined, and new physical marks generated. These new marks may, for example, correspond to pre-selected locations on a construction plan for a road or building.

In its simplest form, the apparatus uses only two SPS receivers 13 and 14, as shown in FIG. 1. One of these receivers 14 is designated as the reference receiver, and in many survey applications this receiver is stationary relative to the Earth. However, there is no constraint that the reference receiver 14 be non-moving, if the coordinates of the reference receiver are known functions of time t. The other receiver 13, designated as the roving receiver, is in motion relative to the reference receiver. The apparatus in which the invention is embodied can be expanded to include multiple reference and roving receivers.

Each of the receivers 13 and 14 can receive L1 and/or L2 carrier signals from a plurality of SPS satellites. A plurality of at least four transmitting satellites 15, 17, 19 and 21 is required. Each of the receivers 13 and 14 is capable of making a measurement of the L1 and/or L2 carrier phase and L1 and/or L2 pseudorange at precise time marks generated by the receivers.

To allow location of pre-selected positions, it is first necessary for the location of the roving receiver relative to the reference receiver to be computed in real-time, and to be available at the roving receiver. This requires a suitable method of communication between the reference receiver and roving receiver, such as a radio link. The reference receiver must broadcast data which includes: (1) the position of a reference mark, such as reference receiver position; (2) observed satellite carrier phase measurements; (3) observed satellite range measurements; (4) information indicating signal losses of lock and cycle-slips, which requires the determination of a new phase integer ambiguity; and (5) optional status information about the reference receiver, for example, the battery charge condition. It is not necessary for the reference receiver to transmit computed satellite positions, as these can be reconstructed in the roving receiver using the ephemerides broadcast by the satellites. It is also not necessary for the roving receiver to transmit back to the reference receiver, although two-way signal transmission is optional (for example, for the purpose of tracking the current position of the roving receiver using position information transmitted by the roving receiver, and received at the reference receiver). Using one-way transmission reduces the complexity of the roving receiver, which receives signals but does not transmit signals and is thus passive.

The bandwidth of the radio link must be sufficient for the data rate of the reference receiver. An example of a radio communication system which meets the requirements of the invention is the TRIMTALK 900 radio modem system manufactured by Trimble Navigation Ltd. These radio modems transmit spread-spectrum signals, using code-division-multiple-access (CDMA) modulation in combination with time-division-multiple-access (TDMA), in a band near 900 MHz. The TDMA allows signal separation between multiple radio modems and radio repeaters, as discussed below. This radio modem system does not require licensing for use within the U.S. A different radio modem may be required for operation outside the U.S. The transmission frequency of the radio modem is not important, provided that sufficient bandwidth is available at the chosen frequency. Likewise, the modulation scheme is not important. Other types of radio modems using different modulation schemes and different transmit frequencies can also be used. An independent satellite communication link could also be used place of the radio modems.

A single transmitter (at the reference receiver) and receiver (at the roving receiver) would require direct radio communication. However, the TRIMTALK 900 system can be configured to operate with a number of radio repeaters. The repeaters effectively receive and retransmit the signal emanating from the reference receiver. When configured to operate with repeaters, the TRIMTALK 900 uses time-division-multiple access (TDMA) for signal separation. One or more repeaters can be placed at different elevations, Radio communication is provided between the reference station and a first repeater, and is provided between the roving station and a second repeater. The first and second repeaters may be the same repeater in some situations. Between these first and second repeaters, many intermediate repeaters can be provided, if necessary, so that direct radio communication is not required between the reference and roving receivers. This is a significant advantage in many operational scenarios, for example, at a building construction site, or where radio communication is obscured by the local terrain or local weather conditions (e.g., snow or sandstorm).

The measurements taken at the reference receiver 14 are formatted using data compression algorithms (optional) and are then transmitted via a radio modem 27, connected to the reference receiver, and are received by another radio modem 29, connected to the roving receiver 13. Optionally, one or more signal repeaters 31 may be used, as discussed above, to help transmit the reference receiver measurement data to the roving receiver 13. Direct radio contact between the receivers 13 and 14 is not required. The measurements may be taken at any time interval, for example once each second. The data formatting compression algorithms reduce the quantity of transmitted data at each time interval. This reduces the required data Baud rate and thus reduces the transmission bandwidth required.

The compression algorithm encodes the satellite measurements as binary fixed-point numbers, with known scale values. The scale values are used later to decode the compressed data within the roving receiver 13, and are recognized by decoding algorithms stored within the roving receiver. Further data compression is possible by recognizing that the rate of change of the pseudorange measurements (in meters/sec), and the rate of the carder phase measurements (when converted to meters/sec by multiplying by the signal wavelength), are very similar. The difference in these rates of change is governed only by ionospheric delay effects, which causes a pseudorange group delay and carrier phase delay with equal magnitude but opposite sign. Because the rates of change of these fundamental satellite signal measurements are similar, one of the measurements is encoded as an offset from the other. The size of this offset value is small and changes as a function of the ionospheric delay rate, and therefore the offset only requires a small data word size (in bits).

Further compression is effectively produced by eliminating the need for the reference receiver 14 to encode and transmit computed satellite locations. Instead, these locations are reconstructed in the roving receiver, using the ephemerides broadcast by the satellites. The satellite locations and velocities are used to account for the different signal phase reception times between the reference and roving receivers.

Although the use of a compression algorithm is preferred, the data can also be transmitted in an uncompressed format, with a corresponding increase in the data rate and bandwidth required. Uncompressed ASCII format data can be used.

The reference receiver 14 is connected to an SPS antenna 33 that is positioned over a reference mark whose location is known with sufficient accuracy. The height of this antenna above the reference mark is recorded together with the reference receiver antenna location and is included in the satellite measurement information transmitted by the reference station modem 27.

The roving receiver 13 is connected to an SPS antenna 35 that is attached to an antenna mount such as a range-pole 37, shown in more detail in FIG. 2. The range-pole 37 is used to locate the pre-selected survey location or other desired location. Preferably, the range-pole 37 has a bubble level or similar instrument 39 to indicate the local vertical direction, for proper vertical orientation of the range-pole. Optionally, the range-pole 37 may have a compass or other direction-indicating instrument 41, to indicate the angular displacement from a magnetic north or true north direction of a horizontal line that passes through the intersection of the range-pole with the Earth's surface. A handheld survey controller 45 is also attached to the roving receiver 13. A handheld computer that meets the requirements of the invention is the TDC (Trimble Data Collector) Survey Controller manufactured by Trimble Navigation Ltd. This incorporates an 8×20 character graphical display, is sufficiently lightweight, and is connected to the roving receiver via a single cable. This cable provides electrical power and a data communication path. Alternative handheld computers include use of pen-based computers, which are becoming popular. The TDC contains a database of pre-selected locations to which the roving receiver must be moved. This database may be loaded prior to conducting the survey, or may be updated in real-time via the reference/roving receiver TRIMTALK 900 radio link discussed above.

The controller 45 optionally incorporates a graphical display 51 that is used to guide the user to the required survey location. The height of the roving station antenna 35 above the ground (i.e. the height of the range-pole 37) is recorded and is entered into the controller 45. Using the invention, one person can locate a new mark position, defined by locations coordinates that are pre-selected, or perform location measurements for an existing mark, using the differential position for the roving receiver 13 determined relative to the known location of the reference receiver 14.

The handheld survey controller 45 includes software with a mapping database, which contains a list of the pre-selected survey or construction locations to be identified. The survey/construction locations may or may not have corresponding physical marks on the Earth's surface. This database may be updated from additional information transmitted from the reference receiver 14 via the radio modems to the roving receiver 13. The database may also be updated in the field by manual entry, using a keyboard, pen and tablet, or other data entry means 47 on the controller 45, as indicated in FIG. 3.

The pre-selected survey/construction locations may be defined in any coordinate system. The GPS satellite system uses the WGS84 geodetic coordination reference system. However, most survey applications use different coordinate systems such as local state plane coordinates, transverse Mercators, Lamberts Conformal, or geodetic reference systems based on the NAD83 or NAD27 reference datum. The pre-selected locations to which the roving receiver must be moved may be specified in any of these coordinate systems or others. Therefore, it is necessary to compute 3-parameter or 7-parameter coordinate transformations in real-time by the TDC survey controller, such that the roving receiver can be moved to a position specified in any coordinate system, although the initial roving receiver position may be calculated using the satellite based WGS84 reference system.

The reference and roving receivers receive and process L1 and/or L2 signals from SPS signals, such as GPS or GLONASS signals, which allow accurate determination of the locations of one or more roving receivers relative to a reference receiver in real-time. These relative positions, also known as differential positions, baseline vectors, or baselines, can be expressed as vector components in an Earth-centered, Earth-fixed coordinate system, or can be translated into other coordinate systems.

Measurements of received carrier phase at the L1 and/or L2 frequencies from both the reference and roving receivers are utilized. If both frequencies are utilized simultaneously, linear combinations of the L1 and L2 carrier phase measurements can be formed. Measurements of either the L1 pseudorange or the L2 pseudorange are not directly required in the method of differential positioning, but may be incorporated to enhance the initialization process (determination of integer ambiguities), and may also be used to provide a less accurate method of position location without the necessity to initialize (determine the integer ambiguities). The inaccuracy in location following initialization is approximately 1–3 centimeters. Without initialization, the inaccuracy in location degrades to approximately 50–100 centimeters. Less accurate determination of position can still be useful in scenarios where an existing physical position mark needs to be located that has not been obscured or hidden.

Whether the method uses only measurements of the L1 carrier phase, or only measurements of the L2 carrier phase, or a linear combination of both L1 and L2 carrier phase, these measurements can be provided by receivers using a channel configuration as described in A Geodetic Survey Receiver with up to 12 L1 C/A-Code Channels, and 12 L2 Pseudo-P-Code Channels, presented by M. T. Allison, D. Farmer, G. Lennen, and K. Martin at the Third International Technical Meeting of the Satellite Division of the Institute of Navigation, Colorado Springs, Colo., September 1990. Alternatively, receivers can be used that have independent L2 P-code channels for each of the received satellite signals, or that have independent L1 P-code channels for each of the received satellite signals. An example of such a receiver is the Model 4000SSE Geodetic Survey Receiver manufactured by Trimble Navigation Ltd, Sunnyvale, Calif., released in July 1992.

The integer ambiguities can be determined by a variety of techniques. For example, the reference and roving receivers may be placed over known positions which have been previously determined using static surveying. Another approach is to use one of three methods disclosed by a recent patent application by Allison et al, U.S. Ser. No. 07/999,099. The method of antenna exchange can also be utilized. All of these methods require the reference and roving receiver antennas to be physically close during the procedure used to determine the phase integer ambiguities. Alternatively, the method disclosed by Allison, in U.S. Pat. No. 5,148,179 can be used. An advantage of this method is that the roving and reference receivers are not required to remain relatively static during the initialization procedure, and are not required to be physically close.

Once the phase integer ambiguities are resolved, the phase measurements, together with the phase integers, provide unambiguous double-difference measurements. These measurements, together with calculations of satellite positions using the satellite ephemerides, and a sufficiently accurate absolute position of the reference station, provide the information required to calculate differential positions. Least square minimization or Kalman filter techniques are then used to compute the differential positions between the two receivers (the baseline vector). A suitable technique of computing the differential positions with determined integer ambiguities, and also without determined ambiguities (with correspondingly reduced accuracy) is described by Allison in U.S. Pat. No. 5,148,179.

The handheld survey controller 45, incorporating a graphical or visual display 51 (optional, shown in FIG. 3), is attached to the roving receiver 13. The controller 45 provides a user interface, such as a keyboard or other data entry means 47, to enable the user to select the pre-selected position, and contains features, described below, that enable the user to be easily guided to the required position. The controller 45 could be integrated into the roving receiver 13, or the roving receiver could be integrated into the controller. In either case, care must be exercised in locating the SPS antenna such that satellite visibility is not obstructed. A handheld computer that meets the requirements of the invention is the TDC (Trimble Data Collector) Survey Controller, discussed above.

Satellite measurements taken by the reference receiver are transmitted to the roving receiver via a TRIMTALK 900 radio modem, discussed above. These measurements, together with similar measurements taken by the roving receiver, can be processed by a computer incorporated into the roving receiver to yield the accurate position of the roving receiver relative to the reference receiver. This computation could equally well occur within the TDC survey controller, or any other computing device attached to either the roving receiver or TDC survey controller.

The roving receiver 13 includes an SPS antenna 35 mounted to a suitable device such as a tripod, bipod, or range-pole 37. The computed roving receiver location is the location of the phase center of the SPS antenna 35. Provided that the height of the SPS antenna 35 above the ground is known (for example, the height of the range-pole), this information can be used to compute the position of the base of the range-pole, which is used to locate the pre-selected position. The range-pole 37 is kept level by the use of a leveling device incorporated into the range-pole, such as a bubble-level 39 shown in FIG. 2. The antenna height is an input signal for the TDC survey controller 45, and the translation of the antenna position to the range-pole base position is computed by the TDC or roving receiver.

The TDC graphical display 51 shown in FIG. 3 is used to guide the user to the required pre-selected location, hereafter referred to as the destination position. A moving picture of the user's location (roving receiver's SPS antenna location) is provided together with an indication of the destination position to which the user must move. Effectively, an electronic map is provided indicating the current position and destination position. The distance from the user's current position, to the destination position together with the required bearing between these positions, is displayed. Once the user is in motion, the direction (bearing) of the user's course over the ground can be computed, and the TDC display can indicate any correction to this direction necessary to place the user on course to the destination.

A fast TDC display update rate is required to provide an effective guidance system, which in turn requires a rapid rate of relative position determination in real-time. A rate of one position computation per second is adequate, but a faster rate is preferable. A fast rate is particularly important when the user is close to the destination position, and final small movements of the roving receiver antenna are being made to accurate locate the pre-selected destination position. A fast rate enhances the response between movement of the range-pole 37, and a corresponding indication of the movement on the TDC graphical display 51. Effectively, a feedback loop is in operation involving hand-eye coordination.

Provision of a graphical user interface 51, on the controller 45 or on the roving receiver 13, as illustrated in FIG. 3, is a preferred method of guidance. However, a simple textual interface can also be used. In this case, the range and bearing are indicated which enable to user to set a correct course to the destination position.

An audible guidance system, which provides audibly perceptible instructions for reaching the destination position, can also be used here. In this case, the guidance information or instructions can be encoded into audio tones with different frequencies and/or durations. The guidance information or instructions may include synthesized speech.

Another device (optional) may be used to facilitate the final positioning of the roving receiver antenna over the pre-selected location. When the antenna is very close to the pre-selected location, as indicated by the TDC graphical display, the antenna is held stationary. The TDC will now indicate a final range offset and bearing from the range-pole to the destination position. A graduated stick 61 incorporating a magnetic compass 63 is now placed at the base of the range-pole, and oriented to align with the bearing of the destination position from the current range-pole position. The range-pole can now be moved along the graduated stick by an amount equal to the indicated range offset, as indicated in FIG. 4. This method aligns the base of the range-pole with the destination position with a single and final update to the range-pole position, and avoids the need to "hunt" around the destination position. The accuracy of the bearing information provided by the roving receiver is a function of both the accuracy of the computed antenna position and the distance between the antenna position and the destination position, and the bearing accuracy decreases as this distance decreases. For this reason, the range offset prior to the final position update using the graduated stick should be fairly large, for example one meter.

An alternative option is to incorporate an azimuth measuring device into the range-pole or TDC (which is in turn attached to the range-pole). A suitable device is a flux-gate azimuths, which can electronically measure azimuth from magnetic north and can input this information to the TDC. The TDC can then compute and display the required direction of the destination relative to the current orientation of the range-pole (incorporating the azimuth device) even when the range-pole and roving receiver SPS antenna are stationary.

Another helpful option is to expand, automatically or upon user command, the scale of the image shown on the graphical user interface when the roving receiver senses that the roving receiver antenna is within a specified distance, such as ten meters, from the pre-selected location, with the new distance scale being indicated on the interface.

We claim:

1. Apparatus for accurately determining the location coordinates of an already-existing physical survey mark on or near the Earth's surface, using differential position determination in real time, the apparatus comprising:

a first Satellite Positioning System (SPS) location determination station with known location coordinates, for receiving SPS signals from at least four SPS signal sources, which are spaced apart from the first SPS station, and for determining location coordinates of the first SPS station from the SPS signals received by the first SPS station;

a second SPS location determination station for receiving SPS signals from at least four SPS signal sources, and for determining location coordinates of the second SPS station relative to the first SPS station from the SPS signals received by the second SPS station, where the second SPS station is provided with the location coordinates of the first SPS station;

an angularly orientable measuring device, having first and second ends and a selected length L, with distances marked along the measuring device, for measuring a distance along the measuring device and for measuring an angular orientation in a substantially horizontal plane of a selected direction determined by the first and second ends of the measuring device; and where, when the measuring device indicates that the second SPS station is within a distance L from the location of a selected physical survey mark, the measuring device is positioned so that the the measuring device extends from the second SPS station location toward the physical survey mark location, and the second SPS station determines location coordinates of the second SPS station relative to the physical survey mark location along the measuring device.

2. Apparatus for accurately determining the physical location of a new survey location that is specified by selected location coordinates on or near the Earth's surface, using differential position determination in real time, the apparatus comprising:

a first Satellite Positioning System (SPS) location determination station with known location coordinates, for receiving SPS signals from at least four SPS signal sources, which are spaced apart from the first SPS station, and for determining location coordinates of the first SPS station from the SPS signals received by the first SPS station;

a second SPS location determination station, for receiving SPS signals from at least four SPS signal sources, and for determining location coordinates of the second SPS station relative to the first SPS station from the SPS signals received by the second SPS station, where the second SPS station is provided with the location coordinates of the first SPS station;

a user interface connected to the second SPS station that indicates, by at least one of a visually perceptible display and an audibly perceptible communication, the location of the second SPS station relative to a new survey location specified by selected location coordinates;

an angularly orientable measuring device, having first and second ends and a selected length L, with distances marked along the measuring device, for measuring a distance along the measuring device and for measuring an angular orientation in a substantially horizontal plane of a selected direction determined by the first and second ends of the measuring device; and where, when the user interface indicates that the second SPS station location is within a distance L from the location of the new survey location, the second station determines location coordinates of the new survey location, relative to the location coordinates of the second SPS station, the measuring device is positioned to extend from the second SPS station location toward a location with the new survey location coordinates and the physical location of the new survey location is determined.

3. A method for accurately determining the location coordinates of an already-existing physical survey mark on or near the Earth's surface, the method comprising the steps of:

receiving Satellite Positioning System (SPS) signals at a first SPS station that determines the location of the first SPS station from the SPS signals received receiving SPS signals at a second SPS station that determines the location of the second SPS station relative to the first SPS station from the SPS signals received, where the second SPS station is provided with the location coordinates of the first SPS station;

determining the location coordinates for the second SPS station, in real time, relative to the first SPS station location, using SPS carrier phase signals received by the second SPS station;

orienting a measuring device, having first and second ends and a selected length L, having distances marked along the measuring device and having an angle measuring mechanism for measuring the angular orientation in a substantially horizontal plane of a selected direction defined by the first and second ends of the measuring device, so that the measuring device extends from the second SPS station location toward the physical survey mark location; and when the second SPS station is within a distance L from the physical survey mark location, using the measuring device to determine at least one of the location coordinates of the physical survey mark location, the location of the physical mark survey location relative to the first phy station, and the location of the physical mark survey location relative to the second SPS station.

4. The method of claim 3, further comprising the step of providing a graphical user interface with said second SPS station that indicates, by a visually perceptible display, said location, or location coordinates, or distance and bearing, of said second SPS station relative to said first SPS station.

5. The method of claim 4, further comprising the step of expanding the scale of said visual display of said graphical user interface when said second SPS station is determined to be within a selected distance from said physical survey mark location.

6. The method of claim 3, further comprising the step of providing an audible user interface with said second SPS station that indicates, by an audibly perceptible communication, said location, or location coordinates, or distance and bearing of said second SPS station relative to said first SPS station.

7. A method for accurately determining the physical location corresponding to new survey location coordinates on or near the Earth's surface, the method comprising the steps of:

receiving Satellite Positioning System (SPS) signals at a first SPS station that determines the location of the first SPS station from the SPS signals received;

receiving SPS signals at a second SPS station that determines the location of the second SPS station relative to the first SPS station from the SPS signals received, where the second SPS station is provided with the location coordinates of the first SPS station and with the location coordinates for a new survey location;

receiving user interface signals that indicate, by at least one of a visually perceptible display and an audibly perceptible communication, the location of the second SPS station relative to a new survey location specified by selected location coordinates;

determining the location coordinates for the second SPS station, in real time, relative to the first SPS station location, using SPS carrier phase signals received by the second SPS station;

orienting a measuring device, having first and second ends and a selected length L, having distances marked along the measuring device and having an angle measuring mechanism for measuring the angular orientation in a substantially horizontal plane of a selected direction defined by the first and second ends of the measuring device, so that the measuring device extends from the second SPS station location toward a location whose location coordinates are the new survey location coordinates; and when the user interface signals indicate that the second SPS station location coordinates are within a distance L from the new survey location, using the measuring device, oriented in the selected direction, to determine the physical location of the new survey location.

8. The method of claim 7, further comprising the step of providing with said second SPS station a graphical user interface that provides said user interface signals and that indicates, by a visually perceptible display, said location, or distance and bearing, of said second SPS station relative to at least one of said first SPS station and said new survey location.

9. The method of claim 8, further comprising the step of expanding the scale of said visual display of said graphical user interface when said second SPS station is determined to be within a selected distance from said new survey location.

10. The method of claim 7, further comprising the step of providing with said second SPS station an audible user interface that provides said user interface signals and that indicates, by an audibly perceptible communication, said location, or distance and bearing, of said second SPS station relative to at least one of said first SPS station and said new survey location.

* * * * *